March 4, 1924.
P. E. PULVERMAN
AIR PRESSURE GAUGE
Filed Dec. 26, 1922
1,485,526
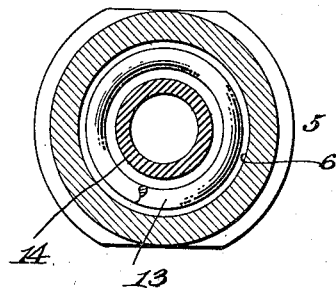
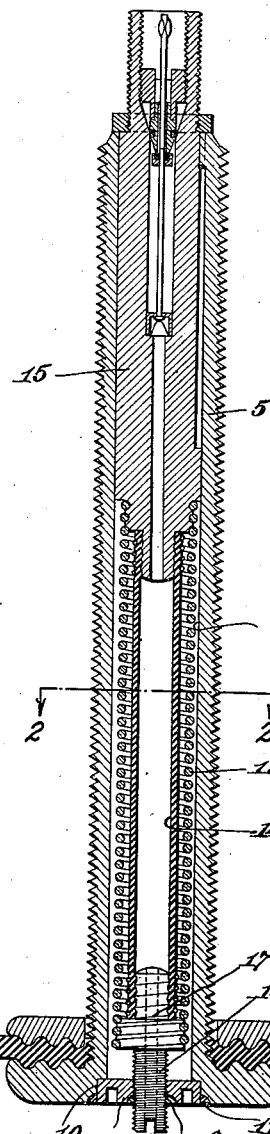
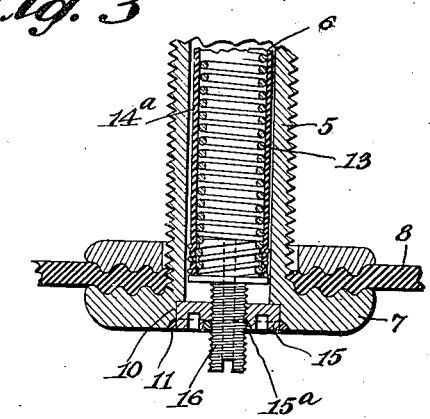
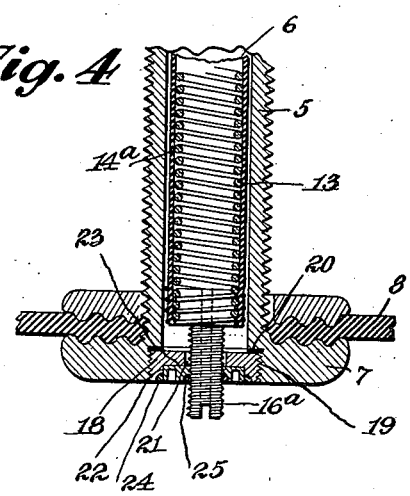
INVENTOR.
Philip E. Pulverman
BY
ATTORNEYS.

Patented Mar. 4, 1924.

1,485,526

UNITED STATES PATENT OFFICE.

PHILIP E. PULVERMAN, OF NEW YORK, N. Y.

AIR-PRESSURE GAUGE.

Application filed December 26, 1922. Serial No. 608,821.

*To all whom it may concern:*

Be it known that I, PHILIP E. PULVERMAN, a citizen of the United States, and a resident of the borough of Manhattan, city, county, and State of New York, have invented a certain new and useful Air-Pressure Gauge, of which the following is a specification.

The invention relates to gauges for determining air or gas pressure in containers, and more particularly to devices for measuring and indicating the pressure in pneumatic tires. The invention is illustrated in connection with the valve by means of which the tire is inflated and deflated, but it is to be understood that it is not limited to such use.

The objects of the invention are to provide a device of the character described which will be of cheap and rugged construction, which will not easily get out of order, in which the tension of the weighing spring may be adjusted, and in which the device is sealed against leakage.

These and further objects will more fully appear in the following specification and accompanying drawings considered together or separately.

In the drawings, in which like parts are designated by corresponding characters of reference—

Fig. 1 is a longitudinal section of a tire valve embodying the invention.

Fig. 2 is a section on the line 2—2 of Fig. 1.

Fig. 3 is a detail sectional view of a modification, and

Fig. 4 is a similar view of another modification.

In the drawings 5 designates a tube or body of a tire valve, the bore 6 of which extends entirely therethrough. At one end the body is provided with the usual flange 7 by means of which the body may be secured in a tire tube 8. The opposite or outer end of the body is open, and a plunger 9 is carried therein and adapted to be moved longitudinally thereof.

The flanged end of the body is counterbored as at 10, and, as shown in Figs. 1 and 2, a flute 11 is formed around the edge of the counterbore.

Mounted within one, the outer, end of the bore 6 is a plunger 9 of the type commonly employed in devices of the character described, and said plunger is connected by means of a spiral spring 13 and a longitudinally expansible tube 14 to a short cylindrical nut 15 carried in the counterbore 10. The nut carries means, such as notches, by which it may be rotated, and a flute 15ª is formed around the outer edge of the threaded perforation in the nut.

Threaded through the nut is a tubular bolt 16 having a head 17 thereon to which the ends of the spring 13 and tube 14 are secured in any desired manner, and the opposite end of the bolt is provided with a kerf for the application of a screwdriver.

Figs. 1 and 2 show the invention applied to a device in which the tube 14 is inside of the spiral spring 13, while in Figs. 3 and 4 the tube 14ª is outside of the spring and between it and the wall of the bore 6.

In the modification illustrated in Fig. 4 the bolt 16ª to which the ends of the spring 13 and the tube 14ª are secured extends freely through a short tubular bolt 18 screwed into a threaded counterbore 19, and a packing gasket 20 is disposed between the bolt 18 and the bottom of the counterbore.

The opening 21 through the bolt 18 is counterbored as at 22 for the reception of a nut 23 which engages the bolt, the counterbore 22 is provided with a flute 24 around the edge, and the threaded opening through the nut 23 has a similar flute 25.

In the forms of the device illustrated in Figs. 1 and 3 the plunger, tube, spring, nut and bolt are assembled as shown, and the structure is inserted through the counterbored end of the body 5, the spring having a certain amount of tension applied thereto when the nut is seated in the counterbore.

The device is now tested by placing the tubular bolt in communication with a source of known pressure. If the scale on the plunger does not indicate the known pressure, the device is removed from the test table, the nut is rotated to the right or left to increase or decrease the tension of the spring, as the case may be, and the device is retested. This operation may be repeated until the scale on the plunger indicates the test pressure.

The device is now removed from the test table and solder, or a cement is run into the flutes thereby sealing the bore of the body against the admission of air except through the tubular bolt 16 or 16ª. After sealing, that portion, of any, of the bolt which projects below the face of the flange may be cut off if desired.

In the form of device illustrated in Fig. 4, the bolt 18 is positioned after the insides are in position, and the nut 23 is screwed down over the bolt 16ª, and testing and sealing are carried out as before.

In accordance with the provisions of the patent statutes the principle of the invention has been described together with the apparatus which is now considered to represent the best embodiment thereof, but it is desired to have it understood that the apparatus shown is merely illustrative, and that the invention may be carried out in other ways.

The invention having been described, what is claimed and desired to be secured by Letters Patent, is—

1. A device of the character described, comprising a tubular body, a plunger carried within and movable longitudinally of the body, said plunger extending beyond one end of the body, a member carried in the opposite end of the bore of the body, a spring secured at its opposite ends to the plunger and member, said spring acting to oppose the separation of the plunger and member, and an element engaging the member whereby the member may be moved longitudinally relatively to the plunger to adjust the tension of the spring.

2. A device of the character described, comprising a tubular body, a plunger carried within and movable longitudinally of the body, said plunger extending beyond one end of the body, a member carried in the opposite end of the bore of the body, a spring secured at its opposite ends to the plunger and member, said spring acting to oppose the separation of the plunger and member, an element engaging the member whereby the member may be moved longitudinally relatively to the plunger to adjust the tension of the spring, and means for securing the element to the member.

3. A device of the character described, comprising a tubular body, a plunger carried within and movable longitudinally of the body, said plunger extending beyond one end of the body, a member carried in the opposite end of the bore of the body, a spring secured at its opposite ends to the plunger and member, said spring acting to oppose the separation of the plunger and member, an element engaging the member whereby the member may be moved longitudinally relatively to the plunger to adjust the tension of the spring, and means for securing the element to the member, said securing means acting as an air seal between the element and member.

4. A device of the character described, comprising a tubular body, a plunger carried within and movable longitudinally of the body, said plunger extending beyond one end of the body, a member carried in the opposite end of the bore of the body, a spring secured at its opposite ends to the plunger and member, said spring acting to oppose the separation of the plunger and member, an element engaging the member whereby the member may be moved longitudinally relatively to the plunger to adjust the tension of the spring, and means for securing the element to the body, said means acting as an air seal between the element and body.

This specification signed and witnessed this 23rd day of December, 1922.

PHILIP E. PULVERMAN.

Witnesses:
A. E. RENTON,
PHILIPPINE FOSS.